Patented Oct. 3, 1950

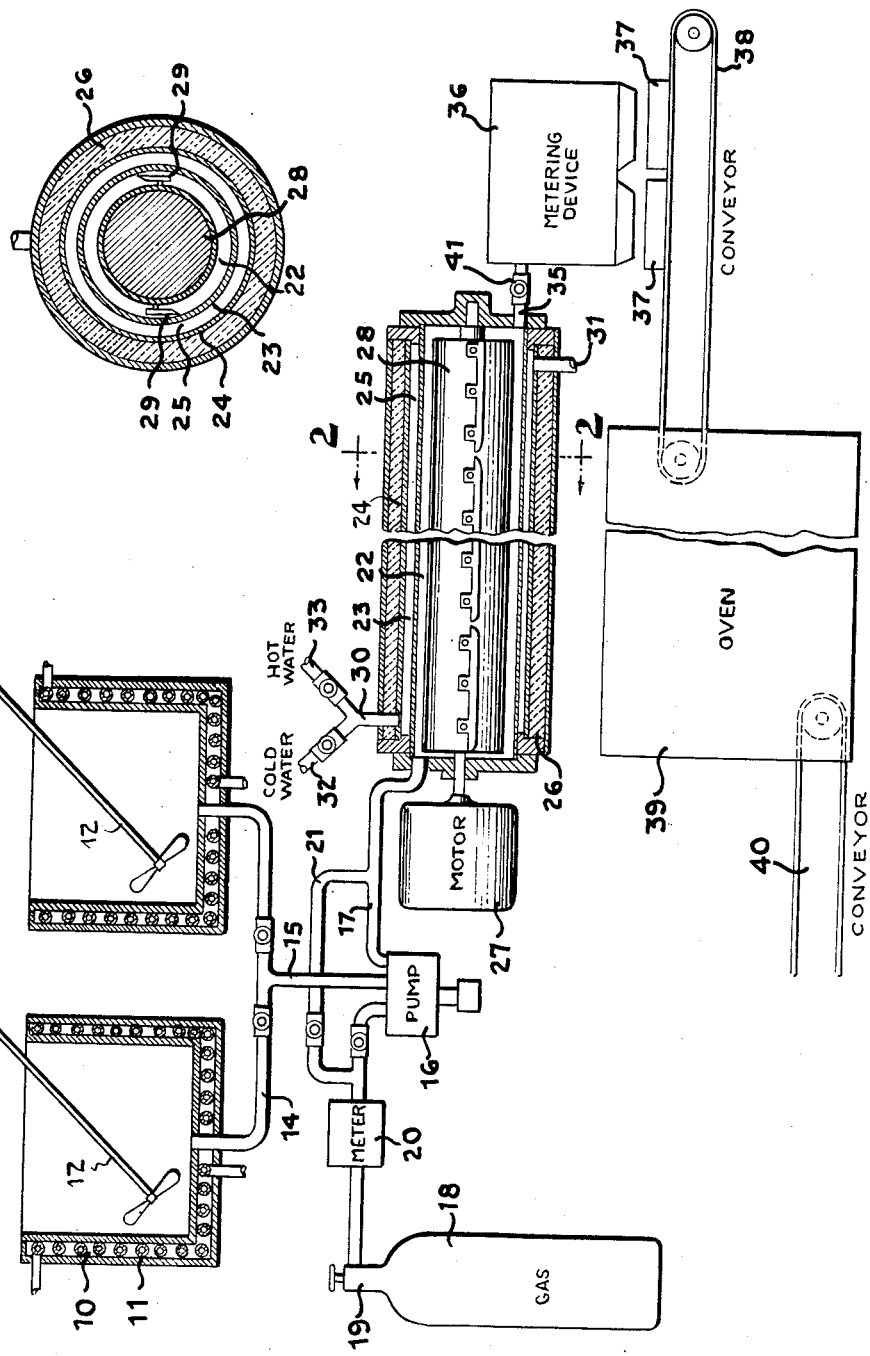

2,524,437

UNITED STATES PATENT OFFICE 2,524,437

CAKE MANUFACTURE

George F. Garnatz, Cincinnati, Ohio, and Bruce De Haven Miller, Louisville, Ky., assignors to The Girdler Corporation, Louisville, Ky., a corporation of Delaware Application August 2, 1947, Serial No. 765,712

9 Claims. (Cl. 99—92)

This invention relates to improvements in the art of making cakes, muffins and the like, and is directed particularly to the preparation of batters from which such products may be baked.

The principal objective of this invention has been to provide a process for preparing batters uniformly and in a substantially routine manner without requiring the extensive artisan skill and judgment of the expert baker, which always has been necessary heretofore. Conventional materials or cake batter ingredients are mixed together in the practice of this process; however, in order to fully understand the nature of the present advance, and the advantages which it provides, a brief explanation of the manner in which cake batters heretofore have been prepared is necessary.

In the conventional modern bakery at the present time, batters are prepared in batches, this work usually being started early in the morning and continuing throughout the day until the cakes are baked. In typical batch preparation, the ingredients are admixed by following a rigid procedure, with careful control of temperature, but the procedure is modified according to the judgment of the baker as the mixing proceeds, to accommodate variable factors which occur from day to day, or batch to batch, and which cannot conveniently be governed.

According to one method, first the fat and sugar are mixed thoroughly, or "creamed," in baking terminology. During this mixing, the volume of material increases about 100% because of the incorporation of air, which is desirable to confer lightness and textures on the final product. The creaming operation, as well as subsequent mixing of other ingredients, is performed in a vertical type mixer consisting of a bowl-shaped container within which a paddle or agitator revolves through a planetary path. A typical batch consists of about two hundred pounds or more.

After creaming, eggs are introduced into the mixing bowl in the required quantity and stirring is continued until the eggs are thoroughly distributed. Next, additional liquid and dry materials are added alternately and in small portions. The liquid materials include water or milk, with or without some sugar dissolved therein, and also may include flavoring components. The dry materials include flour, sugar, salt and baking powder which previously have been sifted together.

By alternately adding first some dry material, then some liquid, then some dry material, etc., the baker is enabled to preserve the balance or the emulsion which has been created in the previous steps. Too much liquid added at one time thins the composition, and it may curdle, or heavy lumps will form which can be broken down only through additional mixing, with impairment of the resultant cake quality. On the other hand, if too much dry material is added at one time, the mixture becomes thick, the balance of the emulsion is again disturbed and extra time is required to reassociate the components; here, too, the quality of the resultant cake may be adversely affected. A skilled baker usually manages, as a result of his experience and judgment, to finish up the mixing operation with just a little of the liquid of the formula left over, which he may use in making final adjustments to provide a batter of the right consistency or viscosity.

During mixing, the bowl is open to the atmosphere in order that air may be incorporated, but the temperature is controlled carefully, by adjusting the temperature of the ingredients, such as the eggs, water and shortening, before they are added to the bowl. The final batter is of relatively thin, fluid consistency, quite mobile, hence, it may be poured readily into pans for baking.

Control of viscosity of a batter prepared by the batch method is a very important factor influencing the quality of the final baked cake product, inasmuch as the viscosity, and the temperature, influence the desired incorporation of air. If the batter is too thin (or the temperature too high), then it is apparent that the batter will lose capacity to hold air; hence, during mixing under such conditions, air will be beaten out of the batter or liberated therefrom just as rapidly as additional air may be beaten into the batter, with no net gain. If the batter is too thick, then air is not introduced properly into the mixture; also, under such circumstances, the gluten of the flour may be developed, which has undesirable effects upon the texture and tenderness of the final product. In this latter respect, cake or muffin batters differ in principle from dough or plastic masses such as those used to produce bread.

As a practical matter, viscosity will vary from day to day or batch to batch, despite the most careful observance of proportions of ingredients in the formulation, due to changes in the initial temperature of the ingredients, the humidity of the atmosphere, the temperature of the atmosphere, and the like. Because of such factors, the baker relies chiefly upon his artisan judgment and experience to make compensating adjustments in the formulation during preparation of the batter, in order that he may end up with a composition of just the right consistency for baking. Good practice has established that the batter temperature should be within the range of approximately plus or minus 2° of 75° F.

The procedure just described has been conventional in the art for many years. Recently, shortening materials containing emulsifying agents have been introduced to the bakery trade to facilitate batter preparation. When such compositions are to be employed, flour and fat, rather than fat and sugar, are first "creamed" together, then approximately one-half of the liquid materials of the formulation is added during further mixing. Next all of the dry materials are incorporated, and finally, all or a portion of the remaining liquid material is introduced. This procedure has the advantage of facilitating emulsification of the components through the presence of the emulsifying agents contained in the shortening, but it is still necessary for the operator to make adjustments from batch to batch or day to day, in order that he may obtain a batter emulsion having proper stability to hold entrapped air during baking and thereby produce the desired texture and volume in the cake.

In either of these procedures, it is apparent that batter preparation is a step by step procedure of a relatively slow and tedious nature. On the average, each mixing step requires two to four minutes; an entire mixing operation will require twelve to eighteen minutes, or longer, if some unusual condition is encountered. On the other hand, while it is recognized that a higher batter temperature will enable baking to be completed in the oven in less time, still, if the temperature of the batter during mixing exceeds substantially 75° F., then the quality of the final product suffers. For this reason, tempering to increase temperature preparatory to baking can be accomplished only by heating the batter slowly and gradually while it is in a quiescent state in a pan which, of course, requires additional time and additional facilities.

The present invention, briefly, is predicated upon the concept and determination that tempering and batter preparation may proceed simultaneously, or that batter preparation may proceed at a higher temperature without liberation of entrapped air, and in a continuous routine manner, by subjecting crudely and indiscriminately mixed batter ingredients, under pressure, to vigorous agitation while such ingredients are confined in a thin film or layer or annulus. In this manner, venting of air from a batter during mixing is prevented even though the temperature is as high as 85 or 90° F. Also, confinement of the components under pressure, or against a substantial back pressure, enables air or neutral gas to be bled into the mixture at a pressure slightly greater than the back pressure, whereby an additional leavening action may be attained, if desirable. A 10° increase in the final temperature of the batter, e. g., from the conventional 75 to 85° F. or more, eliminates all need for tempering equipment or tempering facilities and reduces baking time by substantially ten minutes. Hence, the capacity of available oven equipment commensurately is increased, which, at the present time is an important consideration in the production of most bakeries.

A further advantage provided by the invention determined through experience with a variety of cake formulae, is that mixing of the components under confinement while the components are in the form of a film or thin moving stream, is that the variable factors which heretofore have required the exercise of skill and judgment by the baker are substantially eliminated; that is, a leveling effect is produced which renders variations in humidity or temperature less capable of causing changes in the behavior of the final product. Hence, continuous production of batter, as needed, may proceed in a routine manner in the bake shop. Thus, a relatively crude premixture of the components, without regard to their precise temperature, is prepared, then this premixture is mixed under confinement and a thin film or stream is formed, during which time the temperature is elevated as desired up to a point substantially 10 or 15° higher than heretofore has been possible. In other words, tempering and mixing are conducted simultaneously and the final product is then introduced in pans ready for baking.

The process may be conducted by use of any suitable apparatus capable of subjecting a relatively thin layer of advancing material to intense agitation, but under superatmospheric pressure conditions which will prevent the liberation of air from the material undergoing treatment. Jacketing of the equipment and circulation of a heat transfer medium around the zone of mixing enables temperature to be controlled or increased, as desired. In this manner, cakes of uniform high quality may be produced day by day with less exercise of skill and judgement than heretofore has been possible, and with a substantial increase in the output of existing oven facilities.

The reasons accounting for the uniformity of products produced in accordance with the present invention, as to texture, quality and color, in contrast with the variations in quality of cakes produced by the multiple batch-batter process, cannot fully be explained from the evidence which is available at present. It is believed that confinement of the material during mixing and at relatively high temperature causes a distribution of air originally adherenet to the flour and other ingredients in the form of finely divided nuclei, or tiny bubbles of air capable of serving as focal points at which gases tend to accumulate during baking. The very fine state of subdivision of the air incorporated in this manner renders it less liable to escape, even though the temperature is high. During baking, such air expands in volume, but its volume is supplemented by the liberation of gases produced through the action of leavening agents or baking powder originally introduced as an ingredient, and by water vapor or steam which is released at the baking temperature. The more thorough distribution of these focal points at which gas may accumulate offsets the effects which would otherwise be produced through a variation of temperature or humidity.

Apparatus suitable for commercial practice of the present invention is disclosed in the accompanying drawings. From the foregoing description of the principles upon which the invention is predicated and the following detailed description of the drawings and the following examples, those skilled in the art readily will comprehend various modifications to which the invention is susceptible, In the drawings:

Figure 1 is a diagrammatic view, partly in section, of apparatus adapted to be used in practicing the invention, and Figure 2 is a transverse section taken through an agitator and heat unit as on the line 2—2 of Figure 1, on a slightly enlarged scale.

In utilizing the apparatus shown in the drawings, the ingredients to be used in preparation of the batter, such as flour, milk or water, eggs, shortening or other fat, baking powder, cream of tartar, sugar, flavoring materials, etc., measured so as to be in the desired relative proportions, are placed in the premixing tank 10. This is preferably provided with heat coils 11, and a suitable mixer or agitator 12, driven by a motor 13.

A crude mixture or premixture is formed in the tank 10 and large lumps are broken down so as not to clog passages in the later equipment. For example, agitation is continued until the mixture will pass through a sieve having approximately one-half inch square openings.

The ingredients at this time also may be heated so as to avoid too great a load on the additional heating equipment which is provided in the later final mixing operation, although precaution should be observed in not elevating the temperature too high at this time lest the material be deaerated.

Tank 10 is large enough to hold a supply of material from which a stream may be fed continuously to the final mixer, and therefore, this tank may be provided with insulation, if desired. In practice, the use of two premixing tanks is desirable, one for delivering previously premixed material, while a premixture is being prepared in the other. Thus, as shown in the drawings, two of these tanks are used, each having a conduit 14 controlled by a valve and connected to a common conduit 15 which leads to a pump 16 for delivering the premixture under superatmospheric pressure to an infeed conduit 17.

The final mixing and tempering unit through which the premixture passes under pressure from the pump 16 includes a chamber 22 having a peripheral wall 23 which may be encircled by a jacket 24 to provide an annular space 25 through which temperature changing medium may be circulated. Preferably, the periphery of the jacket is provided with suitable insulation 26. Within the chamber 22, a rotatable agitator is disposed which may be driven in any suitable manner, as for instance, by a motor 27. Although I have illustrated the agitator as having a comparatively large body or core 28 provided with scraper blades 29 acting on the peripheral wall 23, this is preferable, but not essential, as various other types of agitators may be provided which will act to thoroughly mix the ingredients and uniformly disseminate the gas throughout the mixture. In the preferred from shown, the large core 28 is spaced from the peripheral wall 23 so that the agitating chamber is annular and comparatively thin, whereby the material moving through it is subjected to intense agitation. Thus, the volume of material in the chamber is small and there may be a very rapid throughput. In this way a relatively large area of heat transfer surface is presented in proportion to the volume of material under process, thus making possible, in cooperation with the scraper blades 29, a high coefficient of heat transfer during operation. The scraper blades 29 rapidly and effectively remove the material from the peripheral or heat transfer wall so that the formation of adherent films thereon is prevented and there is a rapid and thorough mixing in the thin annular chamber which is maintained under pressure.

The annular jacketed space 25 is provided with an inlet 30 adjacent to one end for the introduction of any suitable temperature changing or temperature controlling medium, and is provided with a suitable outlet 31 at the opposite end. As illustrated, the inlet conduit is provided with two valve controlled branches 32 and 33; for example, one for hot water, and the other for cold water, or other suitable temperature control fluid. By properly controlling the valves, water or fluid of the desired temperature may be delivered to the jacket so as to maintain the mixture being agitated in chamber 22, at about 90 to 95° F., or such other temperature as may be desired.

Due to the efficient agitation, scraping of the chamber walls and temperature control which are produced in the tempering and agitating unit, it may be of relatively small capacity; for instance, the time required for passage of a premixture through the unit while maintaing its temperature at 90° F. may be only nine to ten seconds. Thus, though the volume of material undergoing treatment at any moment is relatively small, the output is substantial since the rate of movement is high.

The cake batter, mixed and tempered in the unit 24, is forced, under pressure created by the pump 16, through a conduit 35 and through a suitable meter device 36 from which it may be discharged in measured amounts into pans or other suitable containers 37. A metering device of the type used for filling jars of mayonnaise is suitable, and it also may serve as a pressure controller for the mixture unit. In the alternative, a separate pressure control 41 may be utilized. The containers 37 supported on a conveyor 38 after being filled are led directly to a heated oven 39 or may be handled in other convenient manner. From the oven, baked cakes are discharged by a continuous conveyor 40. The particular mechanism of the device, the oven and the associated handling facilities form no part of the present invention; therefore, the details thereof have not been illustrated.

During premixing in the tank 10, little or no air taken from the atmosphere is actually beaten into the material. In many instances, the air adhering to the particles of flour, sugar and other solid ingredients is sufficient in amount, when distributed in accordance with this invention, to provide the desired lightness or texture in the final baked product. In other instances, however, additional gas, preferably substantially insoluble in water such as oxygen, nitrogen, or air, may be incorporated in the batter during final mixing to provide additional leavening effect. Pump 16 is operated to deliver the batter premixture at a predetermined and substantially constant rate. Gas, when desirable, may be added from a tank of compressed gas contained in cylinder 18. This apparatus is equipped with a discharge valve 19, and a suitable metering device 20, or other pressure and flow controller, so that there will be a uniform flow of gas in a predetermined amount in respect to the flow of the mixture. The pump 16 therefore discharges both gas and mixture and delivers the two through the conduit 17. In the alternative, the gas may be bypassed around the pump through a conduit 21 to the pump discharge 17 or to a separate intake (not shown) of the agitating unit. In general, the addition of gas is not necessary to obtain improved results in accordance with the present invention, although its use may be desirable. When used, it is added generally to the extent of about 15% by volume of the mixture.

The following examples will illustrate in a detailed way the preparation of batters for making various types of cakes or muffins in accordance with the present invention. In these examples, the percentages of ingredients are based upon the amount of flour used, that is, the flour is taken as 100% by weight, and the other ingredients are proportioned accordingly, as indicated.

Example I.—Rich white layer cake

| Ingredients: | Per cent |
|---|---|
| Cake flour | 100 |
| Shortening | 50 |
| Sugar | 130 |
| Salt | 3 |
| Milk powder | 10 |
| Baking powder | 5.275 |
| Egg whites | 65 |
| Water | 90 |

A crude premixture of these ingredients is established by adding them together and mixing in the tank 10 at room temperature. Any lumps are broken down so that the premix will pass through a sieve having one-half inch openings. The scraper shaft 29 may be operated at 1275 R. P. M., and a back pressure of approximately 40 to 45 pounds is established in the final mixing. At crude batter temperature of 78° F., and without temperature control during final mixing, the processed batter temperature was approximately 77° F. The specific gravity of the batter produced in this manner was approximately .869. Cakes baked from this batter displayed a specific volume of 68.3, in terms of cubic centimeters per ounce of cake.

Example II.—Lean white layer cake

| Ingredients: | Per cent |
|---|---|
| Cake flour | 100 |
| Shortening | 20 |
| Sugar | 65 |
| Corn syrup | 35 |
| Milk powder | 6.9 |
| Salt | 2.5 |
| Baking powder | 4.975 |
| Mono-calcium phosphate | .75 |
| Soya flour | 8.125 |
| Egg whites | 60 |
| Corn syrup | 35 |
| Water | 70 |

Operating the equipment as described in the previous example, but with a crude batter temperature of 69° F., the temperature during final mixing may be elevated to 86.5° F. The specific gravity of the batter produced was approximately .803. The specific volume of the cake baked from such batter was approximately 76.5 cubic centimeters per ounce.

Example III.—Rich yellow layer cake

| Ingredients: | Per cent |
|---|---|
| Cake flour | 100 |
| Shortening | 52.5 |
| Sugar | 120 |
| Milk powder | 8.15 |
| Salt | 3.75 |
| Baking powder | 5 |
| Whole eggs | 60 |
| Water | 30 |

The temperature, in this example, was elevated to 87° F. from a premix temperature of 71° F. The specific gravity of the batter produced was .896, and the specific volume of the cake was 90.8 cubic centimeters per ounce. Operating conditions were as in Example I.

Example IV.—Lean yellow layer cake

| Ingredients: | Per cent |
|---|---|
| Cake flour | 100 |
| Shortening | 20 |
| Corn syrup | 65 |
| Milk powder | 6.9 |
| Salt | 3 |
| Baking powder | 4.035 |
| Mono-calcium phosphate | .4 |
| Soya flour | 8.125 |
| Whole eggs | 50 |
| Corn syrup | 50 |
| Water | 80 |

Using speed of mixing as in Example I and at 40 to 45 pounds back pressure, the specific gravity of the batter obtained at 86° F., was .904, and the specific volume of the cake baked from this batter was 78.6 cubic centimeters per ounce.

Example V.—Devil's food layer cake

| Ingredients: | Per cent |
|---|---|
| Cake flour | 100 |
| Shortening | 30 |
| Sugar | 80 |
| Milk powder | 10.6 |
| Salt | 3.3 |
| Baker powder | 5.475 |
| Cocoa | 21.85 |
| Whole eggs | 77.5 |
| Corn syrup | 90 |
| Water | 102.5 |

Operating conditions were as in Example I. Final batter temperature was adjusted to 86.5° F. and the specific gravity of the batter produced was .882. The specific volume of the cake produced was 87.0.

Example VI.—Pound cake

| Ingredients: | Per cent |
|---|---|
| Cake flour | 100 |
| Shortening | 35.8 |
| Sugar | 120 |
| Milk powder | 7.5 |
| Salt | 2.5 |
| Baking powder | .66 |
| Whole eggs | 70 |
| Water | 52.5 |

Operating conditions were as in Example I. The final batter temperature was adjusted to 87° F. from an initial temperature of the premixture of 76° F. The specific gravity of the batter was .968 and the specific volume of the baked cake was 59.7 cubic centimeters per ounce.

Example VII.—Loaf cake

| Ingredients: | Per cent |
|---|---|
| Cake flour | 100 |
| Shortening | 25 |
| Sugar | 120 |
| Milk powder | 7.5 |
| Salt | 2.5 |
| Baking powder | 1.98 |
| Whole eggs | 57.5 |
| Water | 70 |

A batter of 1.061 specific gravity, resulting in a cake of 64.4 specific volume in terms of cubic centimeters per ounce, was obtained by producing the batter at a final temperature of 85° from an initial premix temperature of 77° under the operating conditions as in Example I.

The foregoing examples illustrate the adaptability of the process of this invention to the production of a wide variety of cakes of differing degrees of richness in formulation. While the temperature shown in the examples are illustrative they may be as high as 90 to 95° F. without sacrifice of quality. In all instances, the quality of the cake is uniform from run to run, with an even distribution of air in the baked product, and with a desired lightness of texture, as indicated by the specific volumes of the materials produced. No special care or attention need be exercised in making the premixture. Final mixing and tempering of the ingredients brings about an intimacy of association thereof which eliminates the variations in quality that otherwise would occur.

From a production point of view, and aside from gains in baking time, the process offers a number of additional advantages. Cleanliness is facilitated and less effort is required to maintain sanitary conditions in the bake shop; thus, the spattering of batter, which is commonplace in batch preparation, is eliminated and the necessity of scrubbing and washing the large bowls of the batch mixers is avoided; in the practice of the present invention the equipment is cleansed thoroughly by merely flushing it with water. On the other hand, the need is eliminated for elaborate hoisting equipment or manual labor necessary to transfer bowls of batter from the mixers to the depositor, with a substantial decrease in labor cost. Likewise, the overall time expended in the preparation of batter, starting with the raw ingredients and ending with the finished product is substantially less than heretofore has been required.

This application contains subject matter common to Miller United States patent application, Serial No. 510,464, filed November 16, 1943, which is now abandoned.

Having described our invention, we claim:

1. A method of preparing a thin, fluid batter adapted to be baked to produce cakes and muffins, which method comprises establishing a crude pourable premixture of the batter ingredients and then progressively propelling a thin stream of the crude premixture through a zone of intense agitation under back pressure, and simultaneously elevating the temperature of the composition during such agitation whereby air originally associated with the batter ingredients is finely distributed throughout the batter to form nuclei at which expanding gases may accumulate during subsequent baking of the batter, then discharging the mixed batter into a zone of atmospheric pressure whereby a batter is produced at an elevated temperature ready for baking.

2. The method of producing cakes and muffins which comprises producing a crude pourable premixture of batter ingredients, then propelling a thin stream of said premixture, under appreciable back pressure, through a zone of intense agitation wherein the batter ingredients intimately are associated, and wherein air initially adherent to some of the batter ingredients is finely and uniformly distributed throughout the mixture, and simultaneously increasing the temperature of the material passing through the zone of intense agitation to a temperature of about 90–95° F., and thereby tempering the batter during intermixing of the components producing a batter which is ready for baking and which need not be subjected to preliminary tempering before baking.

3. A method of preparing cake batter, which comprises forming a crude premixture of batter ingredients, including flour and dry components which contain adherent air and sufficient liquid components to render the crude premixture of fluid consistency, progressively propelling a continuous thin stream of said premixture through a zone of intense agitation under back pressure and thereby intimately associating the batter ingredients one with another and distributing the adherent air throughout the batter to form nuclei at which expanding gases may accumulate during subsequent baking of the batter, and simultaneously tempering the batter by heating it to a temperature substantially above 75° F. during its subjection to intense agitation whereby batter tempered and ready to be baked, is produced.

4. A method of preparing batter for cakes and muffins, which method comprises forming a crude, substantially fluid, premixture of batter ingredients including flour which contains air adherent to the particles thereof, progressively propelling a thin continuous stream of the crude fluid, under back pressure, through a zone of intense agitation whereby the original adherent air is finely distributed throughout the composition to form nuclei at which expanding gases may accumulate during subsequent baking of the batter, simultaneously bleeding inert gas into the mixture for commingling thereof with the mixture during said intense agitation, and simultaneously elevating the temperature of the batter to a temperature substantially above 75° F. during agitation, whereby tempered batter, ready for baking, continuously is delivered from the zone of intense agitation.

5. The continuous process of making a bakery product, which comprises continuously and rapidly passing a crude pourable batter mixture of cake forming ingredients, including shortening, dry ingredients containing adherent air and a gas, as a relatively thin confined layer through a processing zone, maintaining the mixture in said zone at an elevated temperature sufficient to insure softening of said shortening, maintaining the mixture in said zone under back pressure, continuously and intensely agitating said ingredients and gas in said zone to effect thorough mixing of said ingredients and uniform distribution of said gas and adherent air throughout the mixture whereby the said gas and adherent air is finely distributed throughout the composition to form nuclei at which expanding gases may accumulate during subsequent baking of the batter, continuously discharging the resulting batter from said zone at substantially said elevated temperature and releasing the batter from said back pressure, progressively subdividing the heated discharged batter into a series of successive individual batches, and advancing said batches of heated batter to and through a baking zone.

6. The continuous process of producing batter for making bakery products, which method consists in forming a crude batter mixture of cake forming ingredients including flour containing air adherent to the particles thereof, liquid components sufficient to render the crude batter of pourable consistency and an inert gas under super-atmospheric pressure, the inert gas being in sufficient volume to aerate said mixture, continuously advancing said mixture through a zone of intense agitation, while maintaining said mixture under substantial back pressure, thereby forming a cake batter having the gas uniformly disseminated throughout the same and the original adherent air is finely distributed throughout the batter to form nuclei at which expanding gases may accumulate during subsequent baking of the batter, heating said batter to a temperature of at least 85° F. during the advancing, agitation and gas incorporation, and continuously discharging the heated batter to atmospheric pressure.

7. A method of producing cakes and muffins from a batter, which method comprises forming a crude premixture of dry and liquid batter making ingredients, the dry ingredients containing adherent air and the liquid ingredients being sufficient in amount to produce a relatively thin and fluid composition containing no lumps substantially larger than one-half inch in diameter, progressively comminuting said lumps and propelling a thin stream of said crude premixture under back pressure through a zone of intense agitation wherein the batter ingredients intimately are associated and wherein the original adherent air is finely distributed throughout the composition to form nuclei at which expanding gases may accumulate during baking of the batter, and then discharging said batter.

8. The process of claim 5, wherein the crude batter is heated in said processing zone to a temperature of at least 85° F.

9. A process for producing batter for bakery products, which process comprises forming a crude batter mixture of cake forming ingredients, including flour and liquid components sufficient to render the crude batter of pourable consistency, bleeding an inert gas into said mixture in sufficient volume to aerate said mixture, continuously advancing said mixture through a zone of intense agitation while maintaining it at substantial back pressure, simultaneously elevating the temperature of the mixture to about 90–95° F., thereby forming a cake batter having gas uniformly distributed throughout the same, and continuously discharging the heated batter to atmospheric pressure at the elevated temperature to which it has been heated.

GEORGE F. GARNATZ.
BRUCE DE HAVEN MILLER.

REFERENCES CITED

The following references are of record in the file of this patent:

UNITED STATES PATENTS

| Number | Name | Date |
| --- | --- | --- |
| Re. 1,524 | Fitzgerald | Aug. 18, 1863 |
| 19,610 | Perry et al. | Mar. 9, 1858 |
| 40,707 | Perry et al. | Nov. 24, 1863 |
| 1,387,693 | Doyle | Aug. 16, 1921 |
| 1,832,374 | Forby et al. | Jan. 20, 1927 |
| 1,984,027 | Lyons | Dec. 11, 1934 |
| 2,326,134 | Freilich et al. | Aug. 10, 1943 |

FOREIGN PATENTS

| Number | Country | Date |
| --- | --- | --- |
| 2,174 | Great Britain | of 1857 |

OTHER REFERENCES

Lowe: Experimental Cookery (2d ed.), John Wiley and Sons, Inc., N. Y., 1937, pages 488, 490, 492, 493, 499, 503.